US009345038B2

(12) United States Patent
Derham

(10) Patent No.: US 9,345,038 B2
(45) Date of Patent: May 17, 2016

(54) DEVICE SCHEDULING METHOD AND SYSTEM

(75) Inventor: Thomas Derham, Tokyo (JP)

(73) Assignee: FRANCE TELECOM, Paris (FR)

( * ) Notice: Subject to any disclaimer, the term of this patent is extended or adjusted under 35 U.S.C. 154(b) by 116 days.

(21) Appl. No.: 13/695,374

(22) PCT Filed: May 2, 2011

(86) PCT No.: PCT/EP2011/056966
§ 371 (c)(1),
(2), (4) Date: Oct. 30, 2012

(87) PCT Pub. No.: WO2011/135099
PCT Pub. Date: Nov. 3, 2011

(65) Prior Publication Data
US 2013/0051382 A1  Feb. 28, 2013

(30) Foreign Application Priority Data

Apr. 30, 2010  (EP) ..................................... 10290232

(51) Int. Cl.
*H04W 72/08* (2009.01)
*H04B 7/04* (2006.01)
(Continued)

(52) U.S. Cl.
CPC ............. *H04W 72/085* (2013.01); *H04B 7/043* (2013.01); *H04W 72/046* (2013.01); *H04W 84/18* (2013.01)

(58) Field of Classification Search
None
See application file for complete search history.

(56) References Cited

U.S. PATENT DOCUMENTS 7,916,081 B2 * 3/2011 Lakkis ........................ 342/367
8,208,392 B2 * 6/2012 Singh et al. .................... 370/252
8,238,313 B2   8/2012 Maltsev et al.

(Continued)

FOREIGN PATENT DOCUMENTS

EP   2037706 A2   3/2009

OTHER PUBLICATIONS

"IEEE Standard for Information Technology—Telecommunications and Information Exchange Between Systems—Local and Metropolitan Area Networks—Specific Requirements. Part 15. 3: Wireless Medium Access Control (MAC) and Physical Layer (PHY) Specifications for High Rate Wireless Personal Area Networks", IEEE Standard, IEEE, Piscataway, NJ, USA, Oct. 12, 2009, pp. C1-187, XP017604237.

(Continued)

*Primary Examiner* — Hassan Kizou
*Assistant Examiner* — Tejis Daya
(74) *Attorney, Agent, or Firm* — David D. Brush; Westman, Champlin & Koehler, P.A.

(57) ABSTRACT

A method for scheduling pairs in a plurality of pairs of devices for pair communication in a telecommunication network, each pair of devices including a transmitter and a receiver. The method includes: allocating a different time interval to each of the transmitters for emitting training signals, the training signals allowing determining channel estimates; obtaining channel information from at least one receiver having received training signals emitted by at least one of the transmitters, the channel information being determined by the receiver by analysis of the received training signal, the channel information including a channel estimate of a channel between the receiver and the transmitter that emitted the received training signal; and scheduling for pair communication, in the same time interval, the pairs for which a quality indicator verifies a predefined criterion, the quality indicator being determined using channel estimates obtained from receivers of the pairs in the set.

8 Claims, 9 Drawing Sheets

(51) Int. Cl.
*H04W 72/04* (2009.01)
*H04W 84/18* (2009.01)

(56) References Cited

U.S. PATENT DOCUMENTS

| | | | |
|---|---|---|---|
| 8,611,447 B1* | 12/2013 | Gomadam et al. | 375/267 |
| 8,665,834 B2* | 3/2014 | Lee | 370/334 |
| 2007/0153754 A1* | 7/2007 | Shapira et al. | 370/338 |
| 2007/0280116 A1 | 12/2007 | Wang et al. | |
| 2008/0175198 A1* | 7/2008 | Singh et al. | 370/329 |
| 2009/0073954 A1* | 3/2009 | Maltsev et al. | 370/347 |
| 2009/0116444 A1* | 5/2009 | Wang et al. | 370/329 |
| 2009/0232109 A1 | 9/2009 | Nandagopalan et al. | |
| 2012/0113975 A1* | 5/2012 | Kim et al. | 370/348 |

OTHER PUBLICATIONS

International Search Report and Written Opinion dated Jul. 29, 2011 for corresponding International Application No. PCT/EP2011/056966, filed May 2, 2011.

European Search Report dated Oct. 25, 2010 for corresponding European Application No. 10 29 0232.7, filed Apr. 30, 2010.

* cited by examiner

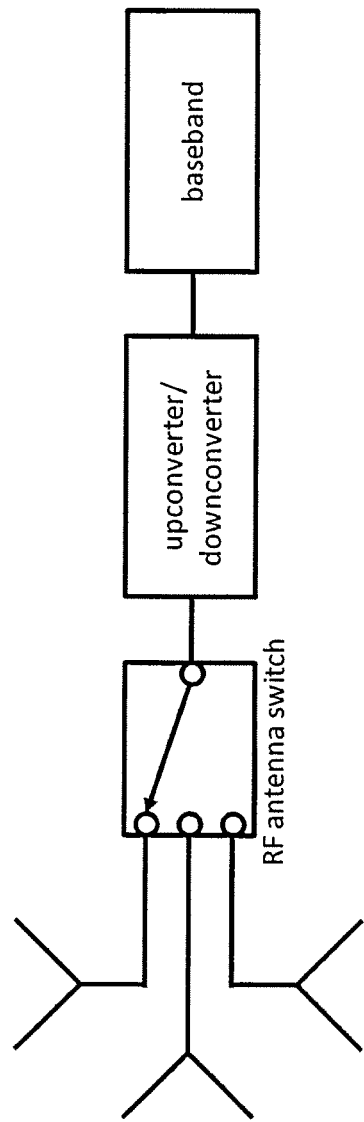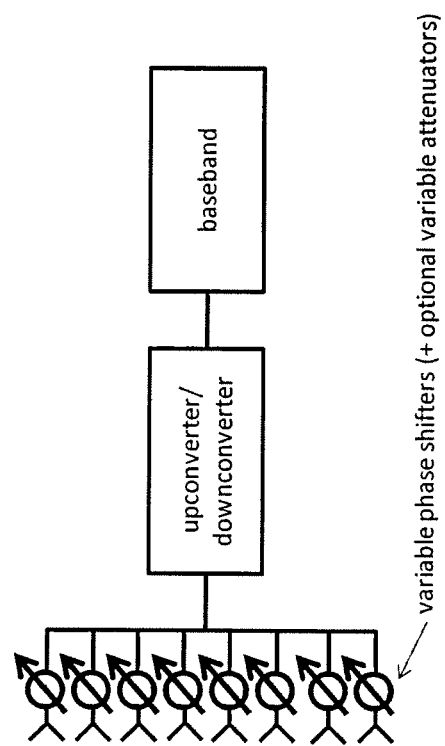
Figure 3A
Figure 3B

US 9,345,038 B2

DEVICE SCHEDULING METHOD AND SYSTEM

CROSS-REFERENCE TO RELATED APPLICATIONS

This application is a Section 371 National Stage application of International Application No. PCT/EP2011/056966, filed May 2, 2011, which is incorporated by reference in its entirety and published as WO 2011/135099 on Nov. 3, 2011, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates in general to telecommunication networks and more specifically to device scheduling in telecommunication networks.

BACKGROUND

Wireless communication networks are designed for convenient data exchange between devices. Communication between one device and another in the network occurs across a wireless link, where the transmitting device or transmitter emits certain electromagnetic signals from its antenna which propagate over the wireless link and are picked up by the antenna of the receiving device or receiver.

Recently, millimeter wave systems operating in the 60 GHz frequency band have been specified to provide data rates of several Gigabits per second (Gbps) over short range (typically up to 10 m). The very wide bandwidth available in the 60 GHz band (7 GHz in most major jurisdictions) means such wireless networks are capable of providing very high data throughput up to several Gigabits per second (Gbps) to support applications such as high-definition video streaming and high-speed bulk data download/upload between devices. Furthermore, one characteristic of 60 GHz wireless networks is that, due to the small RF wavelength (approximately 5 mm), high antenna gain is required to reach the required Signal to Noise Ratio (SNR) over the wide bandwidth with limited transmitter power (typical maximum 10 dBm). Therefore, devices in the network may employ directional antennas, and the antenna beams may be adaptively adjusted to maximize the link quality between each pair of devices. Directional antennas may in principle be used to allow spatial reuse—that is, the directionality of the antennas may reduce the mutual interference between multiple pairs of devices in the same network so that they may be co-scheduled in order to transmit simultaneously on the same channel (i.e. in the same frequency band and at the same time). In such networks, device scheduling (e.g. for further resource allocation to devices) is performed by a network coordinating device or network coordinator. The network coordinator is part of the network and may also be scheduled for communicating in a pair with another device either as a receiver or as a transmitter. When a device wants to join such a wireless telecommunication network, it sends a request to the network coordinator, which will further schedule the device for communicating. Furthermore, pairs of devices that are in an active link, i.e. that have already been scheduled or have made a request for scheduling and are waiting to be scheduled, generally perform a beam training procedure periodically in order to determine the best (highly directional) beam pattern to use on both sides.

In US patent application "Techniques for Wireless Personal Area Network Communications With Efficient Spatial Reuse" (Ser. No. 11/855,862), an interference matrix is generated by the network coordinator with elements comprising an estimate of the interference power that would be caused to one link in a pair of devices by another link in another pair of devices if they were to be co-scheduled. This interference matrix is generated by receivers listening, at different times (i.e. in turn), to the signal from transmitters of other links (i.e. in other pairs of devices). This signal power is then reported by the receivers to the network coordinator. Then, when a request of a device to be scheduled is made that cannot be fulfilled using pure TDMA (i.e. without spatial reuse), then the interference matrix is consulted to find links that can be co-scheduled (i.e. spatial reuse) with low mutual interference in order to make space to grant the new request. The disadvantages of this solution are that, since the beam training for each pair of devices is performed independently and using a finite set of beam patterns that are not optimized to minimize interference, the amount of spatial reuse that is possible will be considerably lower, and hence the aggregate data throughput of the network will not be optimized. In addition, due to the bursty nature of data traffic, the interference levels detected during data communications are not an optimal parameter for further deciding which pairs of devices may be co-scheduled as they may not represent the worst-case interference that will occur if the pairs are co-scheduled. Moreover, once some co-scheduling has been granted to a plurality of pairs of devices, the mutual interference between each individual link can no longer be determined by this solution and revocation of the co-scheduling is necessary, which may cause certain links to be dropped or have outages.

Today there is no solution to efficiently schedule devices that allows reducing interference and thus improving the efficiency of such wireless telecommunication systems. Today there is a need for an efficient device scheduling solution that can be easily implemented on the existing communication infrastructures.

SUMMARY

An exemplary embodiment of the invention proposes a method for scheduling pairs in a plurality of pairs of devices for pair communication in a telecommunication network, each of said pairs of devices comprising a transmitter and a receiver, said method comprising, for a coordinating device in the telecommunication network, the acts of:

allocating a different time interval to each of the transmitters of said plurality of pairs for emitting training signals, said training signals allowing determining channel estimates, obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal, scheduling for pair communication, in the same time interval, the pairs of a set of pairs in the plurality of pairs for which a quality indicator verifies a predefined criterion, said quality indicator being determined using channel estimates obtained from receivers of the pairs in said set.

The use of channel estimates determined by receivers using training signals emitted by transmitters allows defining accurately the pairs of devices (or paired devices) which may be co-scheduled when a quality indicator, determined using the associated channel estimates obtained from said receivers of said pairs, verifies or complies with a predefined criterion.

An embodiment of the invention also proposes a method for scheduling pairs of devices according to claim 2. This has the advantage to allow the calculation by the network coordinator and the use by a given transmitter of transmitter beamforming vectors corresponding to the optimum way (as it based on channel estimates) of transmitting on a channel between said transmitter and the paired receiver taking into account the signals also emitted by other pair(s) when co-scheduled.

An embodiment of the invention also proposes a method for scheduling pairs of devices according to claim 3. This has the advantage to allow the calculation by the network coordinator and the use by a given receiver of receiver beamforming vectors that corresponding to the optimum way (as it based on channel estimates) of receiving on a channel between said receiver and the paired transmitter taking into account the signals also emitted by other pair(s) when co-scheduled.

An embodiment of the invention also proposes a method for scheduling pairs of devices according to claim 4. By defining subsets of devices, the method according to an embodiment of the invention allows subsets of pairs of devices that are further predicted to be suitable for co-scheduling to be chosen without causing any signalling overhead for communicating in the telecommunication network. Since devices in wireless networks are nomadic in many usage cases, an estimate of receiver spatial separation may be obtain that will be reliable in most cases even if a given receiver and the network coordinator directly communicate only infrequently. Subsets creation may be performed for evaluation and co-scheduling, not necessarily to directly allocate resources to all the devices in a subset. Therefore, even if the estimate of receiver spatial separation stored on the network coordinator for a given pair is out-of-date, there is no effect on the performance of the network other than possibly a marginal increase in the signalling overhead to obtain up-to-date channel information for additional pairs of devices in active links in order to find enough pairs in active links suitable for co-scheduling. Furthermore, the use of subsets allows re-scheduling pairs of devices less frequently, reducing overhead in the telecommunication network, improving thus the efficiency of said telecommunication network.

An embodiment of the invention also proposes a method for scheduling pairs of devices according to claim 5.

An embodiment of the invention also proposes a method for scheduling pairs of devices according to claim 6.

An embodiment of the invention also proposes a network coordinating device according to claim 7 providing similar advantages as the associated method.

An embodiment of the invention also proposes a receiver or receiving device according to claim 11 providing similar advantages as the associated method.

An embodiment of the invention also proposes a system according to claim 13 providing similar advantages as the associated methods.

An embodiment of the invention also proposes a readable computer program according to claim 14 providing similar advantages as the associated method.

An embodiment of the invention also proposes a readable computer program according to claim 15 providing similar advantages as the associated method.

BRIEF DESCRIPTION OF THE DRAWINGS

Embodiments of the present invention will now be described solely by way of example and only with reference to the accompanying drawings, where like parts are provided with corresponding reference numerals, and in which:

FIG. 3A schematically illustrates a switched sector antenna assembly according to an embodiment of the present invention;

FIG. 3B schematically illustrates a phased array antenna assembly according to an embodiment of the present invention;

DETAILED DESCRIPTION OF ILLUSTRATIVE EMBODIMENTS

The following are descriptions of exemplary embodiments that when taken in conjunction with the drawings will demonstrate the above noted features and advantages, and introduce further ones. In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims. Moreover, for the purpose of clarity, detailed descriptions of well-known devices, systems, and methods are omitted so as not to obscure the description of the present system. Furthermore, routers, servers, nodes, gateways or other entities in a telecommunication network are not detailed as their implementation is beyond the scope of the present system and method. Unless specified otherwise, the exemplary embodiment will be described hereafter in its application to at least one device of a wireless telecommunication network. In addition, it should be expressly understood that the drawings are included for illustrative purposes and do not represent the scope of the present system.

Figure 1A:
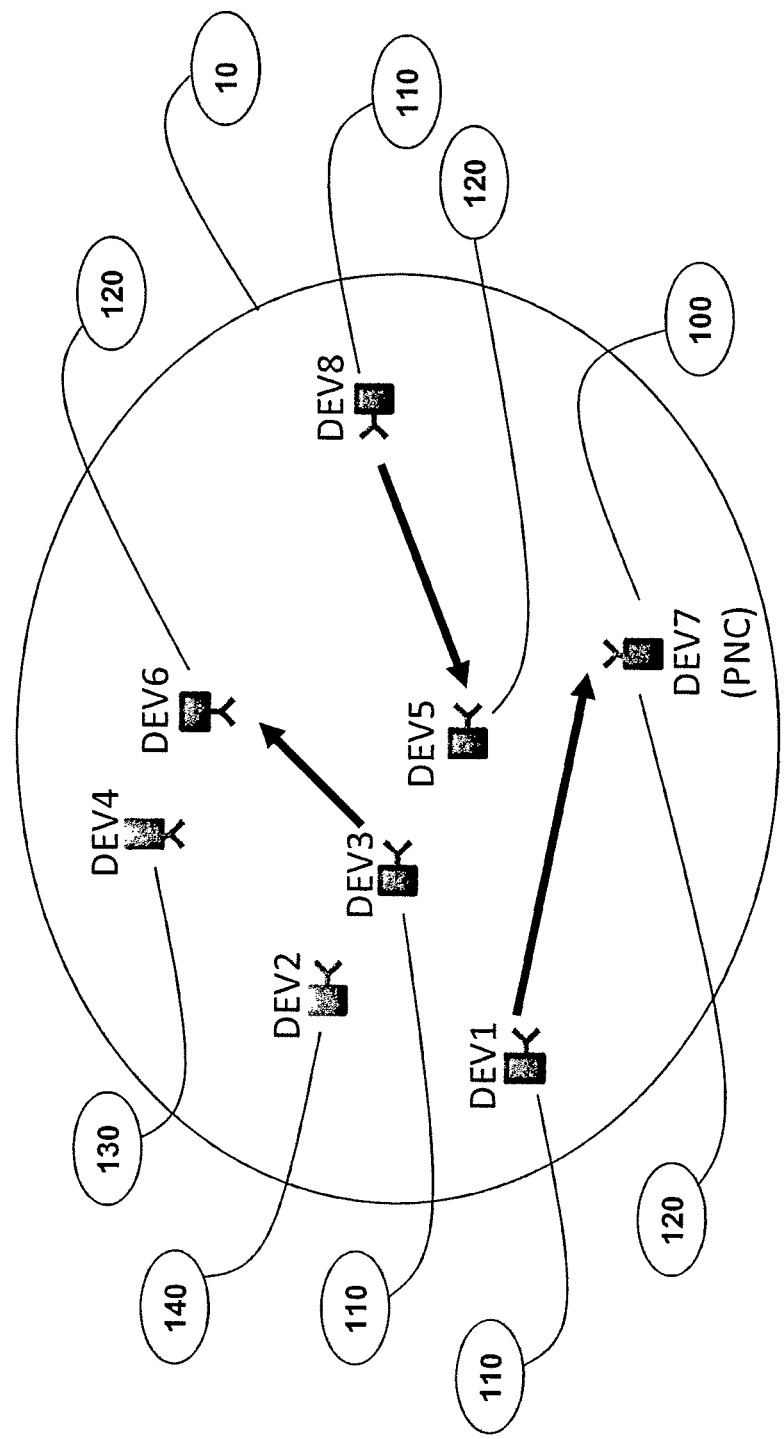
FIG. 1A schematically illustrates a system according to an embodiment of the present invention.
Figure 1B:
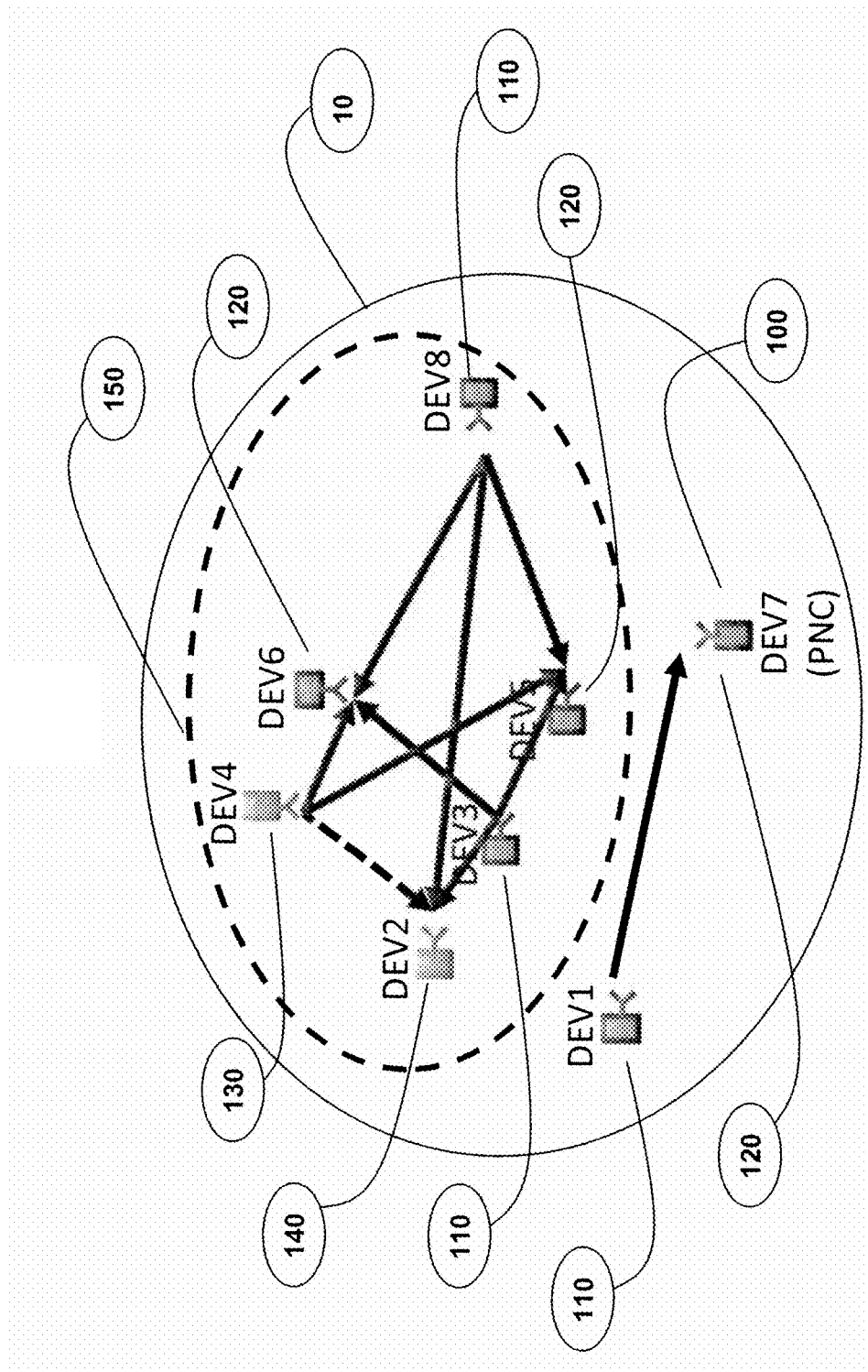
FIG. 1B schematically illustrates a system according to an embodiment of the present invention.

FIG. 1A describes an illustrative embodiment of the system according to the invention. In this illustrative embodiment, the system comprises a telecommunication network 10 wherein devices (DEV) may communicate. Some devices may communicate in pairs, wherein, in each pair, a transmitting device or transmitter transmits 110 data to (or communicates with) a receiving device or receiver 120. A device 130 and a device 140 may wish to join the telecommunication network 10 and be scheduled in order for the device 130 to transmit data to device 140. One device in the telecommunication network 10 acts as a network coordinator 100 (such as e.g. a PicoNet Coordinator (PNC)) and schedules devices for pair communication (i.e. communication within a pair between the transmitter and the receiver of said pair). In order to join the telecommunication network 10, devices 130 or 140 may send a request to join the network in order for the pair of them to be scheduled and optionally further be allocated resources (e.g. time slot(s)) by the network coordinator 100. Scheduled pairs of devices and pairs that have made a request for scheduling but are waiting to be scheduled are pairs with active links. In the IEEE 802.11.TGad standard group, for example, the telecommunication network 10 for which spatial reuse may apply is known as a Personal Basic Service Set (PBSS) (or Independent Basic Service Set (IBSS)), the devices are known as Stations (STAs), and the coordinator may be known as a PCP (PBSS Control Point). For example, in the IEEE 802.15.3c standard, the telecommunication network 10 is known as a piconet, the devices are known as DEVs, and one device in the network is assigned as the network coordinator 100 known as PicoNet Coordinator (PNC)—this terminology is used in the description below. However, it will be appreciated by those skilled in the art that the scope of the current invention is not limited to a particular standard, protocol or terminology, and may be applied to any wireless communications network with directional antennas in any band of frequency. When pairs of devices have been scheduled, they may further be allocated resources (e.g. time-slot(s)) by the network coordinator 100. They may (but are not obliged to) use these said allocated resources to transmit and receive data (i.e. communicate) to the corresponding (or paired) device in the pair. As described in FIG. 1A as an example, transmitting devices DEV1, DEV3 and DEV5 communicate in pairs (i.e. are paired) respectively with receiving devices DEV7, DEV6 and DEV5, while devices DEV4 and DEV2 have not been scheduled by the network coordinator 100 yet, but wish to be able to communicate from transmitting device DEV4 to receiving device DEV2. FIG. 1B describes an illustrative embodiment of the system according to the invention, wherein a subset of devices 150 may be predefined in the telecommunication network 10 as further described here under. Such a subset may comprise for instance pairs of devices which are less likely to create interferences between each other, allowing thus re-scheduling pairs less frequently. Subset definition will be described here under in relationship with the method according to an embodiment of the invention in reference to FIG. 5A. As transmitters DEV1, DEV3 and DEV8 communicate in pairs respectively with receivers DEV7, DEV6 and DEV5, each receiver 120 in each pair of devices may receive signals transmitted by the transmitters 110, i.e. from the paired transmitting device and from the transmitters of other pairs of devices. For example, receiver DEV5 may receive signals from transmitters DEV1, DEV3 and DEV8. Moreover, DEV5 may also receive signals from DEV4, which may transmit data for the purpose of joining the telecommunication network 10 or during an antenna or beamforming training procedure (described here under), i.e. prior to communicating with DEV2.

Figure 2A:
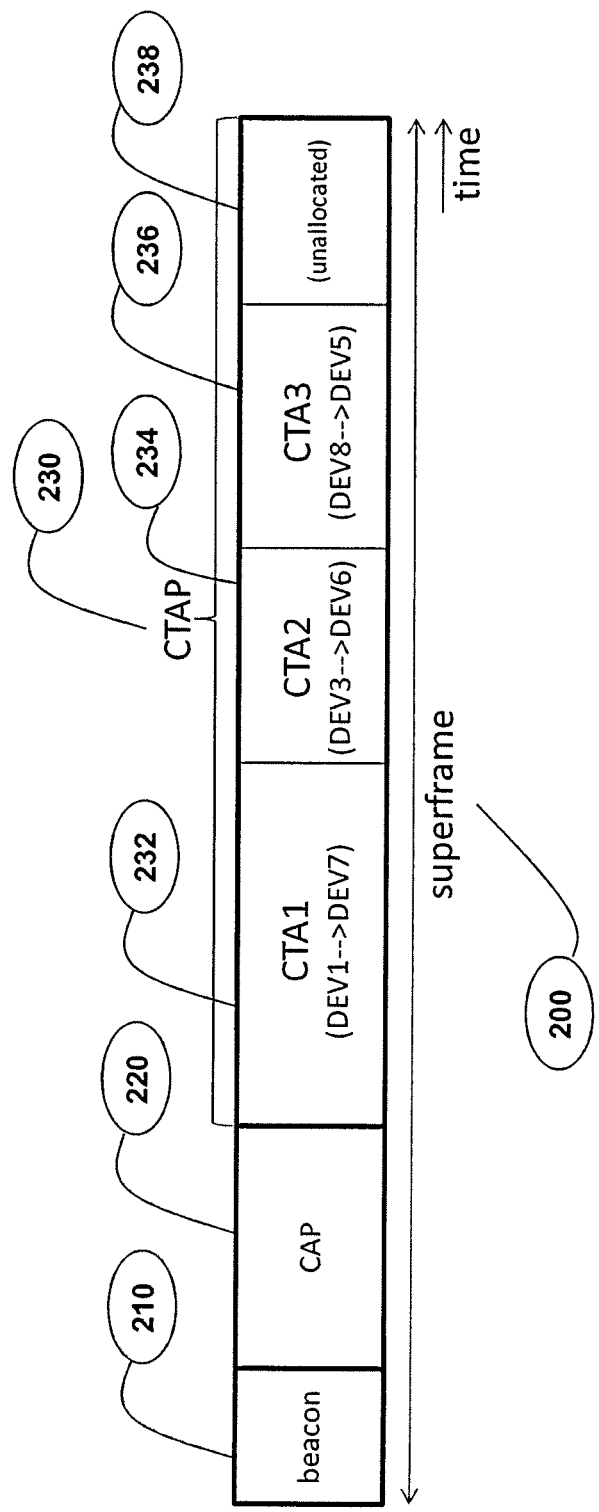
FIG. 2A schematically illustrates a time-domain frame according to an embodiment of the present invention.
Figure 2B:
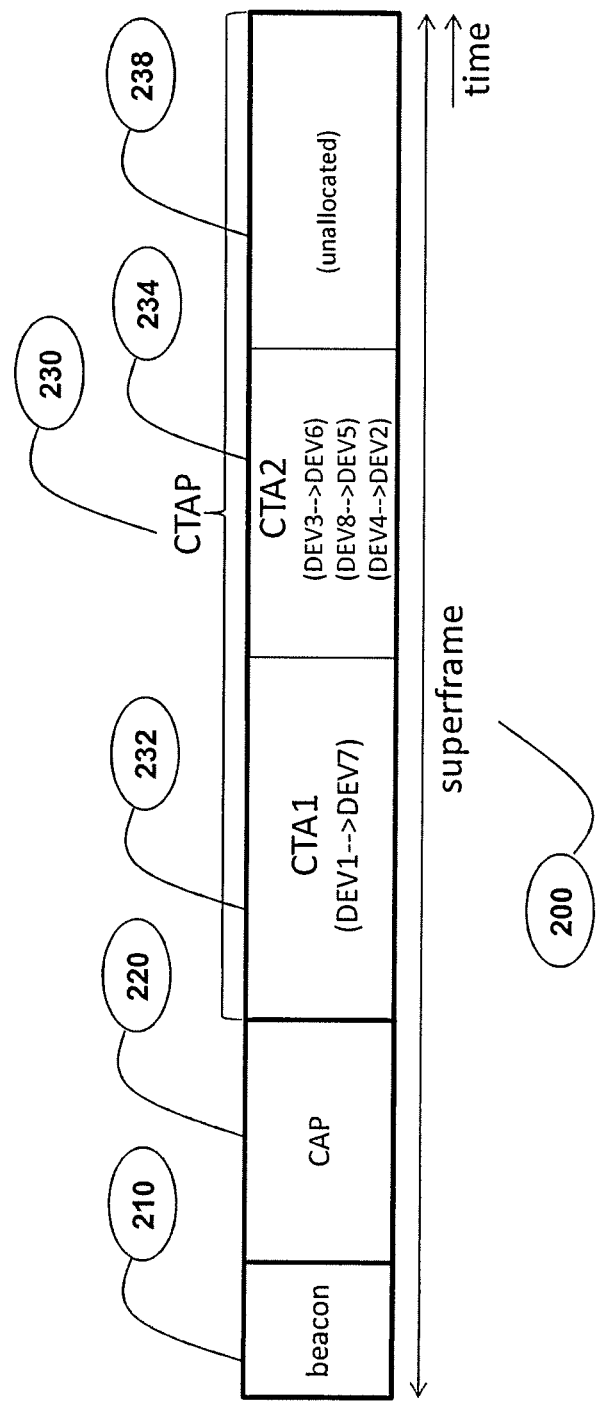
FIG. 2B schematically illustrates a time-domain frame according to an embodiment of the present invention.

In existing 60 GHz-band systems, such as e.g. some Wireless Personal Area Networks (WPANs), the wireless network is known as a piconet, the devices are known as DEVs, and one device in the network is assigned as the network coordinator known as PicoNet Coordinator (PNC). In such networks, transmissions by different devices in the network may be formatted into time-domain structures known as superframes. FIGS. 2A and 2B describe two illustrative embodiments of a time-domain structure or superframe 200 according to the invention. The superframe 200 begins with a short beacon, which is transmitted by the PNC 100 to all devices using a low-rate quasi-omni mode. This beacon contains general network signalling information as well as the timing schedule of channel access granted to particular links between pairs of devices during a Channel Time Allocation Period (CTAP). Following the beacon is a Contention Access Period (CAP). During the CAP, devices may communicate with each other using random contention-based access. The CAP is generally (but not exclusively) used for transmitting Medium Access Control (MAC) frames and acknowledgements. Following the CAP is the CTAP, which is generally the longest part of the superframe and is when devices communicate data with each other with high efficiency using scheduled Time Domain Multiple Access (TDMA). The PNC schedules links between pairs of devices to communicate at different times within the CTAP. The time period allocated to one link is known as a CTA (Channel Time Allocation). The CTAP may comprise one or a plurality of CTAs that may be allocated to different links. In a given CTA, the data flow is essentially unidirectional, however in certain cases the receiving DEV may send acknowledgement frames to the transmitter during the same CTA. If the CTAs within the CTAP are non-overlapping, and a CTA is allocated to only one link—there is no spatial reuse. If a CTA is allocated to several links, there is spatial reuse. When a new device searches for a piconet to join, it firstly tries to detect the beacon transmitted by the PNC, and then transmits association requests during the CAP in quasi-omni mode (since initially the correct beam patterns are unknown). During the association, the device informs the PNC of the best (broadly directional) beam pattern from the quasi-omni set that the PNC should use for future transmissions to that device. In addition, in many cases the PNC and device will perform a specific beam training procedure in order to determine the best (highly directional) beam pattern to use on both sides. A device that wishes to transmit data to another device during the CTAP makes a channel time request to the PNC during the CAP. This request contains the source and destination device IDs for the link and the length of time that channel access is required. In many cases, the device may wish to exchange a stream of data over an extended period, in which case a single request may be made for regular channel access in every subframe (or once in each several subframes) indefinitely. After receiving the request, the PNC tries to find an unused period within the CTAP with which to fulfil this request. If such is found, the PNC then schedules a CTA for this link, and includes the scheduling information in the beacon of the corresponding subsequent superframes. In conventional 60 GHz wireless networks such as IEEE 802.15.3c, if the unused period within the CTAP is inadequate to fulfil the request, it will be denied and the pair of DEVs will not be allowed to communicate. However, in a wireless network where spatial reuse is allowed, the PNC would instead try to co-schedule certain links in the same CTAs so that the request may be fulfilled. If the mutual interference between these links (as observed at the receivers) is adequately low, then this spatial reuse causes the aggregate data throughput of the network to increase. Conventionally, the transmitting and receiving devices of each link independently perform an antenna training procedure called beamforming training procedure (or point to point beamforming training procedure, i.e. between a transmitter and a receiver) to determine the beam patterns of the signals that maximize the signal strength of their link.

However, particularly where the receiving devices of multiple links are closely spaced and/or the wireless propagation channel has significant multipath, this procedure is not adequate to ensure that the mutual interference with spatial reuse will not cause significant degradation of data throughput. Point to point beamforming vectors are vectors derived from a point to point beamforming training procedure, i.e. between a transmitter and a receiver, whereas collaborative beamforming vectors are vectors derived from beamforming training procedure between a receiver and a plurality of transmitters.

FIG. 2A describes an illustrative embodiment of a superframe 200 according to the invention, wherein pairs of devices are each allocated different time intervals (i.e. using pure Time Division Multiple Access (TDMA), without co-scheduling). In each superframe 200, the beacon 210 is followed by the Contention Access Period (CAP) 220, then the Channel Time Allocation Period (CTAP) 230 which comprises successive Channel Time Allocations (CTAs), such as for example CTA1 232, CTA2 234, CTA3 236 and optionally unallocated resources 238. The pair (DEV1, DEV7) may be allocated CTA1 232, while pairs (DEV3, DEV6) and (DEV8, DEV5) may be respectively allocated CTA2 234 and CTA3 236.

FIG. 2B describes an illustrative embodiment of a superframe 200 according to the invention, wherein some pairs of devices are allocated resources in the same CTA (i.e. same time interval), or, in other words, wherein some pairs of devices or links are co-scheduled. In each superframe 200, the beacon 210 is followed by the Contention Access Period (CAP) 220, then the Channel Time Allocation Period (CTAP) 230 which comprises successive Channel Time Allocations (CTAs), such as for example CTA1 232, CTA2 234 and optionally unallocated resources 238. The pair (DEV1, DEV7) may be allocated CTA1 232, while pairs (DEV3, DEV6), (DEV8, DEV5) and (DEV4, DEV2) may be allocated CTA2 234, i.e. co-scheduled in CTA 234, while the time interval 238 remaining after CTA2 234 in the superframe 200 may remains unallocated.

In the system according to an embodiment of the invention, each device may use a directional antenna. As examples, two types of directional antenna assemblies may be used in 60 GHz band devices: switched sector antenna assembly and phased array antenna assembly. The switched sector antenna assembly, an example of which is shown in FIG. 3A, comprises a number of fixed antenna elements with moderate directionality, each of which covers a different region of space. One element is active at a time, and typically the active element is selected by controlling a Radio Frequency (RF) switch. The phased array antenna assembly, an example of which is shown in FIG. 3B, comprises multiple antenna elements, each of which is typically close to omni-directional. The elements are connected together through individual variable phase shifters (and sometimes variable gain controllers such as attenuators). The multiple elements together form a beam that may be highly directional (depending on the number of elements), where the beam pattern is changed by controlling the variable phase shifters (and attenuators). The antenna assemblies to which the present invention applies are not limited to these two assembly types, and may be any other antenna technologies with selectable and/or trainable directional antennas, such as multiple switched RF phased arrays, quasi-optical and Rotman lens beamformers, fully digitized antenna arrays etc. . . .

Figure 4B:
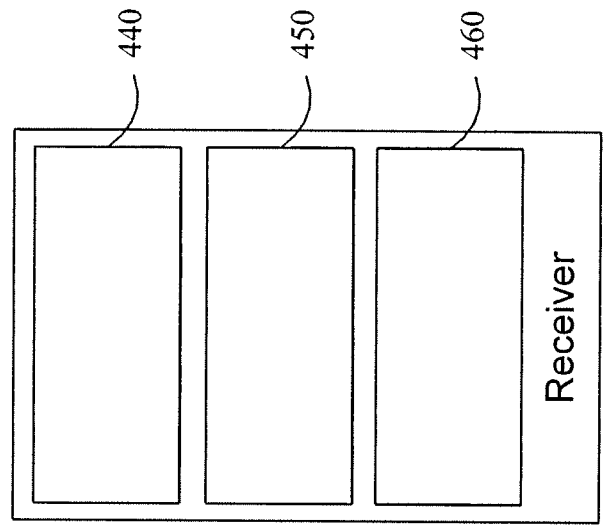
FIG. 4B schematically illustrates a receiver 120 according to an embodiment of the present invention.
Figure 4A:
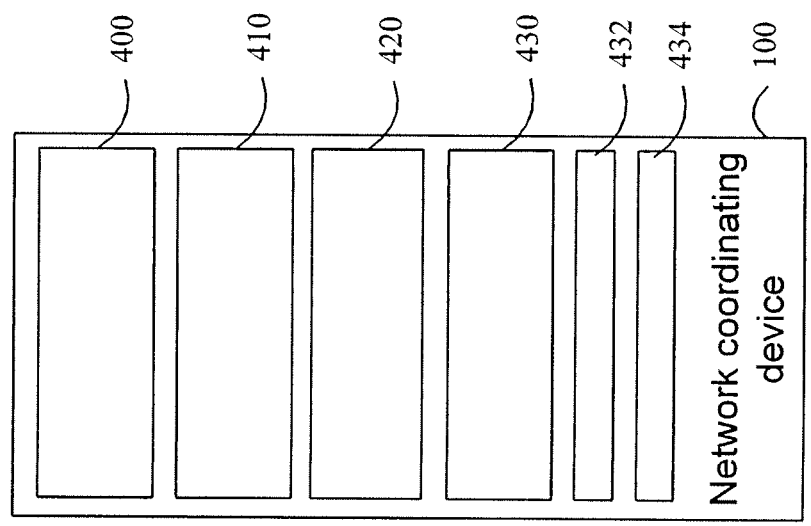
FIG. 4A schematically illustrates a network coordinator according to an embodiment of the present invention.

FIG. 4A describes an illustrative embodiment of the network coordinator 100 according to the invention. In an illustrative embodiment of the network coordinator 100 according to the invention, the network coordinator 100 may comprise a subset definition unit 400. The subset definition unit 400 allows predefining a (at least one) set of pairs of devices using based on an indicator such as e.g. an indicator of spatial separation between the said devices of said pairs (some other examples of indicators are given below in reference to act 500 of FIGS. 5A and 5B). In other words, the subset definition unit 400 allows determining subsets of devices in the telecommunication network 10 for further co-scheduling of some or all of the devices in each subset. For example, if the number of pairs in active links in the network is not too large, the network coordinator 100 may perform the method according to an embodiment of the invention with all the pairs in active links. However, if the number of pairs of active links is large, the network coordinator 100 may decide to perform the method according to an embodiment of the invention with only one or more subsets of active links, where each subset comprises pairs in active links that the network coordinator 100 is likely to be able to successfully co-schedule. For instance, subsets may be chosen by calculating certain values from information already known by the network coordinator 100 such as, for example, indicators of the spatial separation of the receivers for each pair in active links. In the case of using a spatial separation indicator, active links with receivers that are the most widely spaced may be included in the same subset since it is more likely that successful co-scheduling is possible, while active links with receivers that are closely spaced may be excluded from the same subset since it is likely the mutual interference would be high if they were co-scheduled. In an illustrative embodiment of the network coordinator according to the invention, wherein pairs of devices are spatially separated and wherein said spatial separation is quantified by a spatial separation indicator, the subset definition unit 400 may comprise means for defining subsets of pairs of devices in the plurality of pairs of devices using the spatial separation indicator.

In an illustrative embodiment of the network coordinator according to the invention, the network coordinator 100 may comprise an allocating unit 410 comprising means for allocating time intervals to devices. For instance, allocating unit 410 may be used for allocating a different time interval to each of the transmitters of a plurality of pairs for emitting training signals, said training signals allowing determining channel estimates (i.e. for performing act 510 in reference to FIG. 5A as described here under) or for further allocating time intervals to scheduled pairs of devices. The network coordinator 100 may comprise an obtaining unit 420 comprising means for obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal. The network coordinator 100 may also comprise a scheduling unit 430 comprising means for scheduling for pair communication, in the same time interval, the pairs of a set of pairs in the plurality of pairs for which a quality indicator verifies a predefined criterion, said quality indicator being determined using channel estimates obtained from receivers of the pairs in said set (i.e. for performing act 570 in reference to FIG. 5A as described here under).

In an illustrative embodiment of the network coordinator according to the invention, the network coordinating device allows scheduling pairs in a plurality of pairs of devices for pair communication in a telecommunication network, each of said pairs of devices comprising a transmitter and a receiver, said network coordinating device comprising:

means 410 for allocating a different time interval to each of the transmitters of said plurality of pairs for emitting training signals, said training signals allowing determining channel estimates, means 420 for obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal, means 430 for scheduling for pair communication, in the same time interval, the pairs of a set of pairs in the plurality of pairs for which a quality indicator verifies a predefined criterion, said quality indicator being determined using channel estimates obtained from receivers of the pairs in said set.

In an illustrative embodiment of the network coordinator according to the invention, the network coordinating device may further comprises means (that may e.g. be comprised in the scheduling unit 430) for determining transmitter beamforming vectors using the channel estimates associated with the scheduled pairs and means for sending said transmitter beamforming vectors to each associated transmitter of the scheduled pairs, said transmitter beamforming vectors allowing a transmitting configuration of the transmitter for transmitting during the time interval. In an illustrative embodiment of the network coordinator according to the invention, the network coordinating device may further comprising means (that may e.g. be comprised in the scheduling unit 430) for determining receiver beamforming vectors using the channel estimates associated with the scheduled pairs and means for sending said receiver beamforming vectors to each associated receiver of the scheduled pairs, said receiver beamforming vectors allowing a receiving configuration of the receiver for receiving during the time interval.

In an illustrative embodiment of the network coordinator according to the invention, the network coordinator 100 may comprise a determining unit 432 comprising means for determining, among pairs of devices, the pair which causes the most interference. In an illustrative embodiment of the network coordinator according to the invention, the network coordinator 100 may comprise a removing unit 434 comprising means for removing said pair from a set of the plurality of devices.

FIG. 4B describes an illustrative embodiment of a receiver 120 according to the invention wherein the receiver 120 may comprise:

a receiving unit 440 comprising means for receiving training signals emitted by at least one transmitter in a plurality of pairs, a determining unit 450 comprising means for determining channel information by analysis of at least one received training signal, said channel information comprising at least one channel estimate of a channel between the receiver and a transmitter having emitted said at least one received training signal, a sending unit 460 comprising means for sending channel information to a network coordinator in the telecommunication network for further scheduling of the pair of devices comprising the receiver when said pair is in a set of pairs in the plurality of pairs for which a quality indicator verifies a predefined criterion, said quality indicator being determined using channel estimates obtained from receivers of the pairs in said set.

In an illustrative embodiment of the receiver according to the invention, the receiver may further comprises means for receiving receiver beamforming vectors, said receiver beamforming vectors allowing a receiving configuration of the receiver for receiving during the time interval.

In an illustrative embodiment of the system according to the invention, the system allows scheduling pairs in a plurality of pairs of devices for pair communication in a telecommunication network, each of said pairs of devices comprising a transmitter and a receiver, said system comprising:

a telecommunication network comprising a plurality of pairs of devices, a network coordinating device comprising:

means for allocating a different time interval to each of the transmitters of said plurality of pairs for emitting training signals, said training signals allowing determining channel estimates, means for obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal, means for scheduling for pair communication, in the same time interval, the pairs of a set of pairs in the plurality of pairs for which a quality indicator verifies a predefined criterion, said quality indicator being determined using channel estimates obtained from receivers of the pairs in said set.

at least one receiver for scheduling pairs in a plurality of pairs of devices for pair communication in a telecommunication network, each of said pairs of devices comprising a transmitter and a receiver, said receiver comprising:

means for receiving training signals emitted by at least one transmitter in said plurality of pairs, means for determining channel information by analysis of said at least one received training signal, said channel information comprising at least one channel estimate of a channel between the receiver and a transmitter having emitted said at least one received training signal, means for sending the channel information to a network coordinator in the telecommunication network for further scheduling of the pair of devices comprising the receiver when said pair is in a set of pairs in the plurality of pairs for which a quality indicator verifies a predefined criterion, said quality indicator being determined using channel estimates obtained from receivers of the pairs in said set.

Figure 5A:
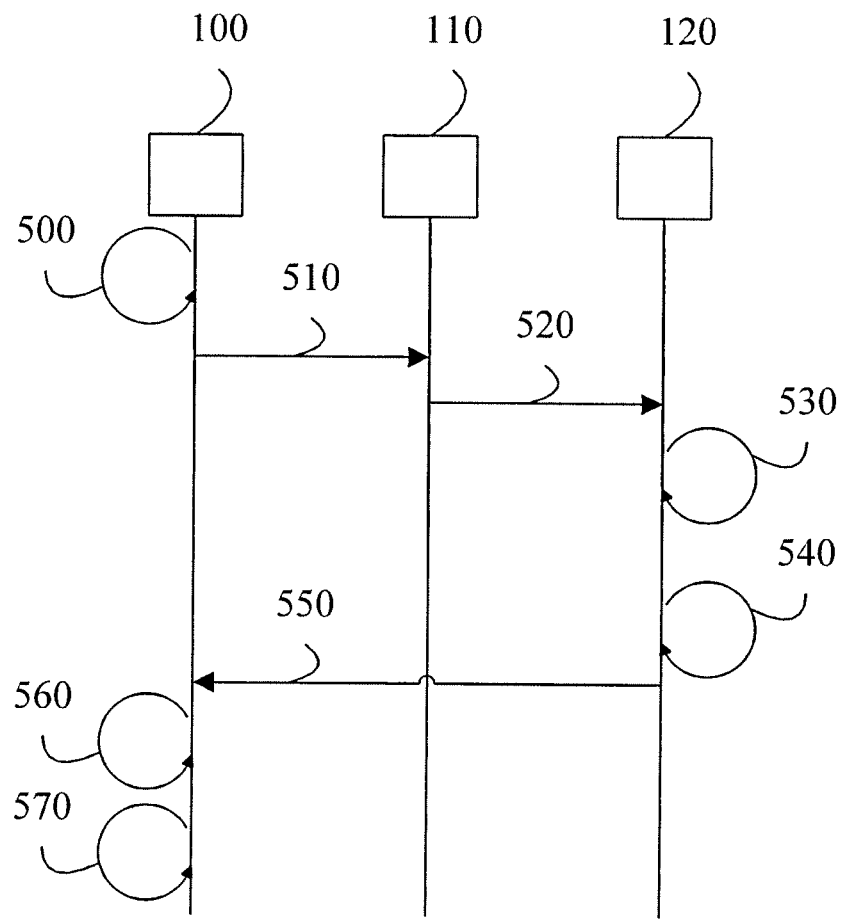
FIG. 5A schematically illustrates a method according to an embodiment of the present invention.
Figure 5C:
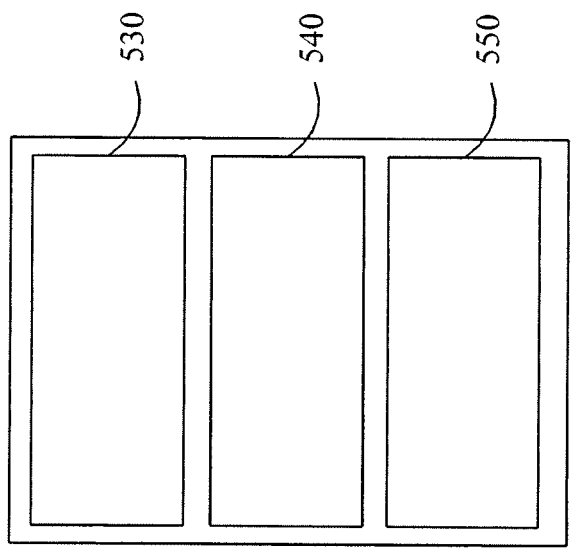
FIG. 5C schematically illustrates a method according to an embodiment of the present invention.
Figure 5B:
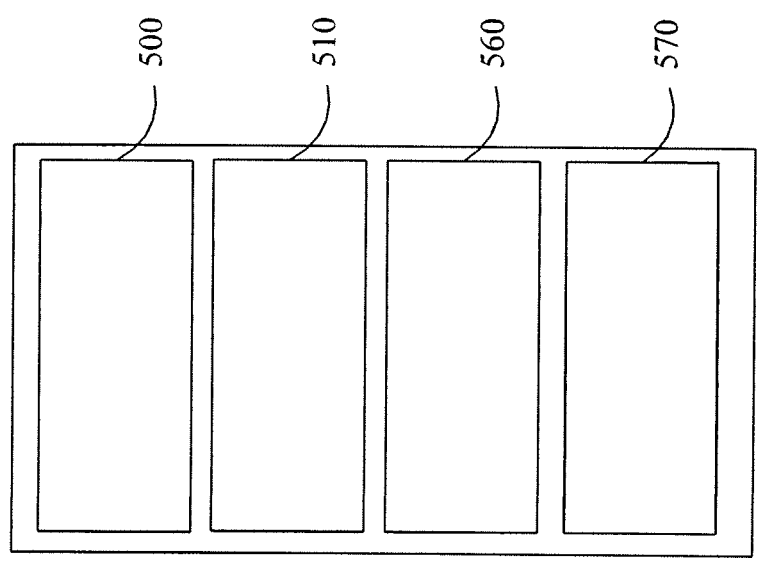
FIG. 5B schematically illustrates a method according to an embodiment of the present invention.

FIGS. 5A, 5B and 5C describe illustrative embodiments of the method according to the invention. The method allows for scheduling pairs in a plurality of pairs of devices for pair communication in a telecommunication network, each of said pairs of devices comprising a transmitter and a receiver, said method comprising, for a coordinating device in the telecommunication network:

an act 510 allowing allocating a different time interval to each of the transmitters of said plurality of pairs for emitting training signals, said training signals allowing determining channel estimates, an act 560 allowing obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal, an act 570 allowing scheduling for pair communication, in the same time interval, the pairs of a set of pairs in the plurality of pairs for which a quality indicator verifies a predefined criterion, said quality indicator being determined using channel estimates obtained from receivers of the pairs in said set.

Illustrative embodiments below illustrate the method according to the invention by referring to FIGS. 1A, 1B, 2A and 2B for illustration purposes. As described in FIGS. 1A and 1B, telecommunication network 10 such as for example a piconet comprises eight devices (DEVs), where DEV7 is acting as the network coordinator 100 or PNC. There are initially three active links which have been allocated resources by the PNC 100 given by DEV1→DEV7, DEV3→DEV6 and DEV8→DEV5. These active links have been scheduled by the PNC in different CTAs (i.e. using pure TDMA as shown in FIG. 2). Initially DEV2 and DEV4 are associated with the piconet but are not actively communicating. In other words, at least one of DEV2 and DEV4 has been exchanging at least one message with the PNC 100 for the purpose of association to the network and possibly also requesting resource allocation for communicating with another device. Some time later, DEV4 makes a channel time request to the PNC to establish an active link DEV4→DEV2 for a certain duration within the CTAP. Since there is inadequate remaining time in the CTAP to grant this request, the PNC begins a procedure to co-schedule certain active links with spatial reuse as described here under.

An act 510 allows a network coordinating device 100 to allocate a different time interval to each of the transmitters of the plurality of pairs for emitting training signals, said training signals allowing determining channel estimates. In order for receivers to provide channel information as described here under in act 520, the network coordinator 100 allocates a different time interval or CTA to each pair of devices in an active link for this purpose (e.g. to the transmitter in each pair of devices in with an active link since the time slot is used by one transmitter and (generally) multiple receivers are listening to the transmissions) and informs the pairs of devices (either both the receiver and transmitter in each pair or the transmitter only in each pair or the receiver only in each pair) of this in the beacon of a superframe 200. This CTA shall (preferably) not be co-scheduled with any other links or other beam training procedures in order that interference does not reduce the quality of the channel information obtained. The CTAs for each pair in active link do not necessarily need to be scheduled in the same superframe.

An act 520 allows the transmitters, in the plurality of pairs of devices, which may have been each been allocated a different time interval, to emit training signals for performing a cross-link beam training procedure. A cross-link beam training procedure for a given pair in active link i in the plurality of pairs of devices is performed as follows. The transmitter of the pair in active link i sequentially transmits $R_i^{(r)}$ repetitions of a predefined training signal, which itself is sequentially repeated $R_i^{(t)}$ times. For each of the $R_i^{(t)}$ repetitions, a different transmit beamforming vector is used from a predefined transmit codebook of size $K_i^{(t)}=R_i^{(t)}$. The receiver of each pair in active link k in the subset captures these training signals using, within each set of $R_i^{(r)}$ repetitions, a different beamforming vector from a predefined receiver codebook of size $K_k^{(r)} \leq R_i^{(r)}$. The advantage of such a cross-link beam training procedure is that the receivers of one or multiple pairs in active links k in the plurality of pairs capture these training signals, whereas in existing beam training procedures, only the receive DEV of the same link k=i captures the training signals. In addition, while existing beam training procedures are used to directly determine the best beamforming vectors from the codebooks (for example by choosing the combination that results in the greatest received signal power), in the cross-link beam training procedure it is used to determine channel estimates. The codebook matrices $W_i$ and $D_i$ used by the transmitters and receivers, respectively, of pairs in active link during the cross-link beam training procedure may be defined as follows:

$$W_i = [w_{1,i} w_{2,i} \ldots w_{K_i^{(t)},i}] \quad [1]$$

$$D_i = [d_{1,i} d_{2,i} \ldots d_{K_i^{(r)},i}] \quad [2]$$

where $w_{l,i}$ is the lth beamforming vector (out of $K_i^{(t)}$) used by the transmitter of link i during the beam training procedure, and $d_{m,i}$ is the m th beamforming vector (out of $K_i^{(r)}$) used by the receiver of link i during the beam training procedure. Vector $w_{l,i}$ components may represent for instance the complex weights applied by the antenna array of the transmitter while $d_{m,i}$ may represent for instance the complex weights applied by the antenna array of the receiver. For example, during cross-link beam training, a transmitter may transmit training signals using vector $w_{1,i}$ for $K_i^{(r)}$ repetitions while a receiver may receive each of the transmitted training signals of each repetition using successively vector $d_{1,i}, d_{2,i} \ldots d_{K_i^{(r)},i}$. Then the transmitter may further transmit training signals using vector $w_{2,i}$ for $K_i^{(r)}$ repetitions while the receiver may receive each of the transmitted training signals of each repetition using successively vector $d_{1,i} d_{2,i} \ldots d_{K_i^{(r)},i}$. Then the transmitter may carry out the same process (along with the receiver) for the remaining $w_{3,i} \ldots w_{K_i^{(t)},i}$ vectors for a total of $K_i^{(t)} \times K_i^{(r)}$ repetitions. Noting that the receivers of multiple links may simultaneously have been performing this process in synchronization with a given transmitter, this completes a full cross-link training procedure. In existing beam training, the receiver simply determines the signal power received for each repetition in order to decide the best combination of beamforming vectors from the codebooks while, in an illustrative embodiment of the method according to the invention, the complex amplitude (not power) of the received training signals (optionally after normalizing by the transmitted waveform) may be stored by the receiver. The stored elements may then further allow estimation of the channels between a receiver and a plurality of transmitters which have performed the cross-link training procedure as described here under. After the cross-link beam forming procedure has been performed for all active links in the telecommunications network 10 (or for all active links in a subset), each receiver (respectively each receiver in the subset) will have captured the beam training signals from all transmitters (respectively all transmitters in the subset.

As an illustration of an embodiment of the method according to the invention, FIG. 1B shows the case where one subset was chosen comprising three active links—the existing links DEV3→DEV6 and DEV8→DEV5 and the newly requested link DEV4→DEV2. As a result of the above cross-link beam training procedure, the receivers (e.g. DEV6, DEV5, DEV2) may capture signals relating to the channels of these links and the cross-link channels between transmit DEVs and receive DEVs of the different links. For example, receiver DEV5 may capture signals relating to the channel of its active link DEV8→DEV5 and the channels DEV3→DEV5 and DEV4→DEV5. From these signals, each receiver DEV may determine some channel information (as described here under) for both its own active link and the cross-link channels between the other transmitters in the subset and itself, which it may then transmit back to the PNC in the CAP.

It is appreciated that different devices in the telecommunication network 10 may have different capabilities to perform the calculations necessary to determine certain forms of channel information from these signals. For example, certain devices may be designed to minimize cost and/or power consumption and so have very limited processing capability beyond the basic communications functions while, on the other hand, the device chosen as the PNC will generally have higher capabilities because typically the network promotes the device with the highest capabilities to become the PNC. In addition, in the case of certain devices, the codebook matrices used in the cross-link beam training procedure may be non-square, or the devices may have only a fixed antenna (rather than a phased array), which means that the channel information they can obtain is limited. Therefore, a device may calculate one of several forms of channel information according to its capabilities and transmit it back to the PNC, and the PNC may use any of these several forms to perform scheduling in an illustrative embodiment of the method according to the invention.

FIGS. 5A and 5C describes an illustrative embodiment of the method according to the invention, the method allows scheduling pairs in a plurality of pairs of devices for pair communication in a telecommunication network, each of said pairs of devices comprising a transmitter and a receiver, said method comprising, for a receiver in the telecommunication network:

an act 530 for receiving training signals emitted by at least one transmitter in said plurality of pairs, an act 540 for determining channel information by analysis of said at least one received training signal, said channel information comprising at least one channel estimate of a channel between the receiver and a transmitter having emitted said at least one received training signal, an act 550 for sending the channel information to a network coordinator in the telecommunication network for further scheduling of the pair of devices comprising the receiver when said pair is in a set of pairs in the plurality of pairs for which a quality indicator verifies a predefined criterion, said quality indicator being determined using channel estimates obtained from receivers of the pairs in said set as described here under.

In an illustrative embodiment of the method according to the invention, the channel estimates may be one of a frequency-domain channel estimate, a narrowband Multiple Input Multiple Output channel matrix, a transmitter-side spatial covariance matrix or eigenvectors and eigenvalues of a transmitter-side spatial covariance matrix as described here under.

An act 530 allows a receiver 120 to receive training signals emitted by at least one transmitter in said plurality of pairs. An act 540 allows determining channel information by analysis of said at least one received training signal, said channel information comprising at least one channel estimate of a channel between the receiver and a transmitter having emitted said at least one received training signal.

This channel information, and the format of the feedback to the PNC 100, may take different forms depending on the values of $K_i^{(t)}$ and $K_i^{(r)}$ and the beam training codebook used in the cross-link beam training procedure above. In an illustrative embodiment of the method according to the invention, the cross-link training procedure for link i may be performed where the number of repetitions may be given by $R_i^{(t)} = K_i^{(t)} = M_i^{(t)}$ (where $M_i^{(t)}$ is the number of elements in the phased array of the transmit DEV of link i) and $$R_i^{(r)} = \max_k (K_k^{(r)} = M_k^{(r)})$$

(where $M_k^{(r)}$ is the number of elements in the phased array of the receiver DEV of link k), and the codebook matrices $W_i$ and $D_i$ may be square unitary matrices. For the channel between the transmit DEV of active link i and the receiver DEV of active link k, the received training signal corresponding to a given combination of transmit and receive beamforming vectors (l,m) may be defined in the frequency domain as the vector $x_{(l,m)i,k}$, where the elements $x_{(l,m)i,k}[q]$ correspond to the qth sub-carrier. Similarly, the normalized transmitted training signal may be defined in the frequency domain as the diagonal matrix T. Then, the frequency-domain channel estimate $\hat{y}_{(l,m)i,k}$ may be calculated using the well-known optimal MMSE estimator:

$$\hat{y}_{(l,m)i,k} = R_{(y)} T^H (T R_{(y)} T^H + NI)^{-1} x_{(l,m)i,k} \quad [3]$$

where $R_{(y)}$ is the frequency-domain covariance matrix of the channel $y_{i,k}$ (assumed equal for all links) which may be easily approximated by the receiver, and N is the receiver noise power. It will be appreciated by those skilled in the art that there are various other algorithms that may alternatively be used to achieve substantially the same result without any effect on the claims of the current invention (for example the least-squares frequency-domain estimate $\hat{y}_{(l,m)i,k} = T^H x_{(l,m)i,k}$), and also that the calculation may be performed in the time domain instead of the frequency domain, or on only sub-carriers in the frequency domain, using e.g. various known methods.

Then, one of the following forms of channel information may be calculated by each receiver device.

Form 1: the channel estimates may be an estimate of the narrowband Multiple Input Multiple Output (MIMO) channel $\hat{H}_{i,k,q}$ (sub-carrier q, transmitter of active link i, receiver of active link k) for the channels between all transmit DEVs and this receiver DEV on certain sub-carriers. Indeed, in an illustrative embodiment of the system according to the invention method according to the invention, the resources of a MIMO channel may be divided in a number of sub-carriers in the frequency domain that may be allocated to the same pair of devices. In this case, the channel $\hat{H}_{i,k,q}$ might be different between sub-carriers due to frequency-dependent fading created by signal multipaths. This form might be used where possible since it allows the PNC to collaboratively calculate beamforming vectors for the receiver as well as the transmitter, thus further reducing interference. However, feedback of these matrices involves greater overhead than the other methods below, so it shall not be used where the feedback overhead (given by the number of sub-carriers for which the matrix will be fed back, the dimensions of each matrix, and the number of transmit DEVs in the subset) is greater than a threshold, which may be determined according to the network load during the CAP. These matrices may be calculated by first forming the matrix $\hat{Y}_{i,k,q}$ where $\hat{Y}_{i,k,q}[l,m] = \hat{y}_{(l,m)i,k}[q]$, and then calculating:

$$\hat{H}_{i,k,q} = D_k^* \hat{Y}_{i,k,q} W_i^H \quad (4)$$

The certain sub-carriers for which $\hat{H}_{i,k,q}$ may be calculated may be equally spaced in frequency by an amount equal to the coherence bandwidth of the channel. Alternatively, in order to reduce feedback overhead at the expense of accuracy, a larger spacing between sub-carriers (or even just a single, central sub-carrier) may be selected. Each element of the matrices $\hat{H}_{i,k,q}$ (both real and imaginary parts) on these sub-carriers may be quantized to a fixed number of bits to further reduce feedback overhead.

Alternatively, in the case where the network controller has knowledge of matrices $D_k$ and $W_i$, the receiver may instead feed back the matrix $\hat{Y}_{i,k,q}$ for the same sub-carriers (quantized in the same way as above), in which case the network controller may calculate $\hat{H}_{i,k,q}$ itself according to Equation (4). In this case, the computational complexity required in the receiver may be further reduced. In addition, the overhead of feed back of channel information updates due to subsequent changes to the channel may be reduced since only the elements of $\hat{Y}_{i,k,q}$ (corresponding to the received signal for particular combinations of beamforming vectors) that have significantly changed need by fed back.

Form 2a: the channel estimates may be an estimate of the transmitter-side spatial covariance matrix $\hat{R}_{i,k}$ of the MIMO channel. $\hat{R}_{i,k}$ is a matrix that is derived from an operation on $\hat{H}_{i,k,q}$ (e.g. averaged over multiple instances of $\hat{H}_{i,k,q}$, such as over multiple sub-carriers), and describes the spatial properties of the channel in terms of the correlation between the different transmitter elements and the receiver (i.e. it describes the correlations between elements of $\hat{H}_{i,k,q}$). This feedback form may be used when a lower feedback overhead is required compared to Form 1. The matrix may be calculated as:

$$\hat{R}_{i,k} = \frac{1}{Q} W_i \left( \sum_{q=0}^{Q-1} \hat{Y}_{i,k,q}^H \hat{Y}_{i,k,q} \right) W_i^H \quad [5]$$

where Q is the number of sub-carriers. It is appreciated by those skilled in the art that, while the estimate of $\hat{R}_{i,k}$ may be calculated by averaging over all sub-carriers q, it may be instead calculated by averaging over the same subset of sub-carriers as described relating to Form 1 to reduce the computational complexity. The elements of the matrix $\hat{R}_{i,k}$ may be quantized in the same way as above. The feedback is reduced compared to Form 1 because there is only a single matrix to feed back per channel, and only one half of the elements (e.g. the lower-triangular elements) need be fed back since the matrix is conjugate-symmetric.

Form 2b: the channel estimates may be certain eigenvectors and eigenvalues of the transmitter-side spatial covariance matrix of Form 2a. The eigendecomposition may be calculated by a receiver using for example the known QR method (or any other method), resulting in a matrix of normalized eigenvectors $\hat{Q}_{i,k}$ and eigenvalues $\Delta_{i,k}$ where:

$$\hat{R}_{i,k} = \hat{Q}_{i,k} \Delta_{i,k} \hat{Q}_{i,k}^H \quad [6]$$

since by definition $\hat{R}_{i,k}$ is a complex normal matrix (Hermitian matrix).

The eigenvectors are vectors equal to the columns of matrix $\hat{Q}_{i,k}$, while the eigenvalues are the corresponding values on the diagonal of matrix $\Delta_{i,k}$. For the case of the receiver own active link i=k, the receiver feeds back the eigenvectors and eigenvalues corresponding to the $n_{i(dom)}$ largest (dominant) eigenvalues. For the case of the cross-links i≠k within the subset, the receiver feeds back the eigenvectors and eigenvalues corresponding to the $n_{i,k(van)}$ smallest (vanishing) eigenvalues. The value $n_{i(dom)}$ is chosen such that the ratio of the sum of eigenvalues fed back compared to the sum of all eigenvalues is above a threshold, while the value $n_{i,k(van)}$ is chosen such that the ratio of the sum of eigenvalues not fed back compared to the sum of all eigenvalues is above a threshold. The larger the threshold, the more accurately the fed back channel information can be used to reconstruct $\hat{R}_{i,k}$, but the larger the feedback overhead is. Therefore, the threshold should be chosen according to the maximum tolerable feedback overhead, which may be determined according to the network load during the CAP.

Form 2c: The channel information may comprise codebook indices corresponding to approximations to certain eigenvectors and eigenvalues of the transmitter-side spatial covariance matrix $\hat{R}_{i,k}$ of Form 2a. This feedback form will be used in the case that the transmitter-side training codebook matrices $W_i$ is non-square (i.e. $K_i^{(t)} < M_i^{(t)}$) or significantly non-orthogonal, since then $\hat{R}_{i,k}$ cannot be calculated directly. In addition, it may be used if the receiver is not capable of performing the matrix multiplications required to calculate the previous forms, or if a very low feedback overhead is required (since only the codebook indices are fed back). However, since this channel information is only an approximation to the eigenvector and eigenvalues, the performance of the collaborative beamforming is reduced if this feedback form is used. In order to determine this channel information, during the cross-link beam training procedure, the receiver uses its set of quasi-omni beamforming vectors in place of $D_k$, and calculates the sum of the resulting SNRs over the quasi-omni beams for each transmit beamforming vector. For the case of the receiver's own active link i=k, it feeds back the indices of up to $n_{i(dom)}$ mutually orthogonal transmit beamforming vectors from the codebook that result in the largest summed SNRs, together with those SNRs. For the case of the cross-links i≠k within the subset, the receiver DEV feeds back the indices of the $n_{i,k(van)}$ mutually orthogonal transmit beamforming vectors from the codebook that result in the lowest summed SNRs, together with those SNRs. These beamforming vectors and corresponding SNRs are rough approximations to, and so can act as proxies for, the required eigenvectors and eigenvalues of the transmitter-side spatial covariance matrix.

In some cases, the receiver may have only a switched sector antenna (not a phased array). In this case, the receive sector is fixed to the best sector according to conventional sector training for the receiver's active link, and then any of the channel information forms 2a, 2b or 2c may be used simply by setting $K_k^{(r)} = 1$.

Form 3: the channel information may comprise an effective SNR value based on measurement from the training procedure. This feedback form will be used for the case that the transmitter does not have a phased array (e.g. only a switched sector antenna). In this case, the transmitter-side spatial covariance matrix does not exist, the transmit DEV beam pattern cannot be collaboratively determined, and the channel information is used only for the scheduling process. During the cross-link beam training procedure, the transmitter is fixed to the best sector according to conventional sector training for its active link with $K_k^{(t)} = 1$, and the receiver uses its set of quasi-omni beamforming vectors in place of $D_k$, and calculates the sum of the resulting SNRs over the quasi-omni beams.

An act 550 allows a receiver 120 to send the channel information to a network coordinator in the telecommunication network for further scheduling of the pair of devices comprising the receiver where said pair is in a set of pairs in the plurality of pairs for which a quality indicator verifies a predefined criterion, said quality indicator being determined using channel estimates obtained from receivers of the pairs in said set. Indeed, once the receiver has determined one of the forms of channel information above, it feeds it back to the network coordinator e.g. in a MAC frame together with the corresponding transmit and receiver IDs.

In certain cases, the receiver may have determined by observation of several previous beam training procedures that the best beamforming vector, best sector or other channel information is frequently changing significantly, indicating that the spatial characteristics of the channel are rapidly varying (for example, due to mobility of the devices). In this case, the receiver may reply to the PNC request with a MAC frame that means co-scheduling is not recommended, since it is unlikely that its active link may be successfully co-scheduled with other links over an extended period of time (in which case the higher overhead required to track the changes to its active link and the cross-links may not be worthwhile).

An act 560 allows the network coordinating device 100 to obtain channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal.

In an illustrative embodiment of the method according to the invention, the method may further comprise the acts of determining transmitter beamforming vectors using the channel estimates associated with the scheduled pairs and sending said transmitter beamforming vectors to each associated transmitter of the scheduled pairs, said transmitter beamforming vectors allowing the transmitter to transmit signals during the time interval (e.g. to the paired receiver or to another receiver) with a spatial beam pattern associated with the channel estimates determined by said receiver as described here under in reference to act 570.

In an illustrative embodiment of the method according to the invention, the method may further comprise the acts of determining receiver beamforming vectors using the channel estimates associated with the scheduled pairs and sending said receiver beamforming vectors to each associated receiver of the scheduled pairs, said receiver beamforming vectors allowing the receiver to receive signals during the time interval (e.g. from the paired transmitter or from a another transmitter) with a spatial beam pattern associated with the channel estimates determined by said receiver as described here under in reference to act 570.

Once the PNC has received the requested channel information for the pairs in active link and cross-links, it then uses this channel information to collaboratively determine the co-scheduling, in an act 570, and transmit beamforming vectors when needed as described below. The criterion used for this purpose may be the Signal to Leakage Ratio (SLR). For a particular hypothesized set of co-scheduled pairs in active links, the SLR for a given pair with/in an active link is the ratio of the signal power received at the receiver of the active link compared with the sum of the power received at the receivers of all other co-scheduled links, plus receiver noise. The estimate of SLR for active link i may be given by:

$$SLR_i = \frac{\overline{w}_i^H \hat{R}_{i,i} \overline{w}_i}{N_i + \sum_{k \neq i} \overline{w}_i^H \hat{R}_{i,k} \overline{w}_i} \quad [7]$$

where $\overline{w}_i$ is the transmitter beamforming vector, the sum in the denominator is taken over all cross-link channels in the hypothesized set, and $N_i$ is the receiver noise power for the pair in active link.

Firstly, estimates of the transmitter-side spatial covariance matrices may be regenerated. In the case of Form 1 channel information, i.e. $\hat{H}_{i,k,q}$ (or $\tilde{Y}_{i,k,q}$) for one or more sub-carriers, $\hat{R}_{i,k}$ may be calculated as:

$$\hat{R}_{i,k} = \frac{1}{Q'}\left(\sum_q \hat{H}_{i,k,q}^H \hat{H}_{i,k,q}\right) \quad [8]$$

where the summation is performed over the Q' sub-carriers for which $\hat{H}_{i,k,q}$ is available.

In the case of Form 2b or 2c channel information, an approximation to $\hat{R}_{i,k}$ is calculated from the available eigenvectors and eigenvalues according to Equation [6].

In the case of Form 3 channel information, the term $\overline{w}_i^H \hat{R}_{i,k} \overline{w}_i$ is set to the corresponding available normalized SNR value.

Then, the SLR in Equation (9) is calculated for each active link in the subset where $\overline{w}_i$ is set to the dominant eigenvector of $\hat{R}_{i,i}$, which is equal to the optimal transmit beamforming vector when considering only the active link (i.e. without considering interference due to co-scheduling).

If this SLR for all active links is adequately high (above a threshold), then the subset of active links is co-scheduled by the network coordinator in the same CTA, and the transmitters continue to use the transmit beamforming vectors they have determined from the conventional beam training procedure for the active link. The threshold may be determined by the network coordinator according to the allowable degradation in the quality of the active links in the subset due to mutual interference.

However, if the SLR for one or more active links is below the threshold, and where Form 1 or Form 2 channel information is available, the PNC should calculate the transmitter-side collaborative beamforming vector that maximizes the SLR for these links, which is found by calculating the matrix:

$$\tilde{R}_i^{Tx} = \left[\left(\left(\sum_{k \neq i} \hat{R}_{i,k}\right) + N_i I\right)^{-1} \hat{R}_{i,i}\right] \quad [9]$$

and then setting the transmitter-side beamforming vector to:

$$\overline{w}_i = \text{eig}\{\tilde{R}_i^{Tx}\} \quad (10)$$

where the operator eig{X} finds the dominant eigenvector of X.

Then, the SLR is recalculated based on these new collaborative beamforming vectors. If these SLR for all active links are now above the threshold, then the subset of active links is co-scheduled by the network coordinator in the same CTA. In addition the transmitter-side collaborative beamforming vectors $\overline{w}_i$ are transmitted to the corresponding transmitters in a MAC frame (for example, in the CAP). These transmitter-side collaborative beamforming vectors will be used by the transmitters whenever the same subset of active links is co-scheduled, until such time as they are revoked by the network coordinator.

If one or more SLRs are still below the threshold, then the active link with the worst SLR (i.e. that would cause the greatest interference) is removed from the subset, and the SLRs recalculated. This process continues until all SLRs are above the threshold, or there is only one active link remaining in the subset.

The information about the scheduling and co-scheduling of active links is broadcast by the network coordinator in the beacon of each superframe.

When transmitter-side collaborative beamforming is used, in general the corresponding receivers may continue to use the same receiver beamforming vectors as used conventionally, i.e. those determined by the receiver itself from the beam training procedure. However, in the case that the receiver provides Form 1 channel information, the network coordinator may also determine receive-side collaborative beamforming vectors which serve to further reduce the interference level due to co-scheduling. In order to do this, the effective receive-side spatial covariance matrix (conditional on the transmitter-side collaborative beamforming vector calculated above) is determined as:

$$\hat{R}_{i,k}^{Rx(\overline{w}_i)} = \frac{1}{Q'} \sum_q H_{i,k,q} \overline{w}_i \overline{w}_i^H H_{i,k,q}^H \qquad [11]$$

where $\overline{w}_i$ is the transmitter-side collaborative beamforming vector. Then, the receive-side collaborative beamforming vector which maximizes the Signal to Interference plus Noise Ratio (SINR) is found by calculating the matrix:

$$\tilde{R}_k^{Rx} = \left[\left(N_k I + R_{Other} + \sum_{i \neq k} (\hat{R}_{i,k}^{Rx(\overline{w}_i)})\right)^{-1} \hat{R}_{k,k}^{Rx(\overline{w}_i)}\right] \qquad [12]$$

where $R_{Other}$ is the receive-side spatial covariance matrix of interference caused by other sources (for example overlapping BSS or other in-band transmissions), if known. Finally, the receive-side beamforming vector is set to:

$$\tilde{r}_k = \text{eig}\{\tilde{R}_k^{Rx}\} \qquad [13]$$

and is transmitted to each corresponding receiver in a MAC frame (for example, in the CAP).

One additional advantage of this process is that the PNC can now directly estimate the SINRs for each link that would result from co-scheduling, which allows for a precise assessment of the impact of co-scheduling on the throughput of each link, compared to using the SLR. The SINR for link k is calculated as:

$$SINR_k = \frac{\tilde{r}_k^T \hat{R}_{k,k}^{Rx(\overline{w}_i)} \tilde{r}_k^*}{N_k + \sum_{i \neq k} \tilde{r}_k^T \hat{R}_{i,k}^{Rx(\overline{w}_i)} \tilde{r}_k^*} \qquad [14]$$

Therefore, in this case the SINR should be used in place of the SLR for determining co-scheduling—in other words, if the SINR for all active links in a subset is adequately high (above a threshold), they may be co-scheduled by the PNC in the same CTA. The threshold for each link may be determined based on known QoS requirements—for example, where the network coordinator knows that a certain data rate is required for a given link, it should only co-schedule the link if the SINR is above that necessary to meet the required data rate.

As an illustration of an embodiment of the current invention, FIG. 2B shows the resulting co-scheduling in the superframe where, after calculating the collaborative beamforming vectors it was found that the SLRs (or SINRs) of both the existing links and the newly requested link in the subset of FIG. 1B were above the threshold and so were scheduled in one CTA.

Having co-scheduled multiple links in one CTA, the network coordinator continues to schedule CTAs at regular intervals for the purpose of re-performing the cross-link training procedure. In this way, changes to the mutual interference between the co-scheduled links can be tracked and corrective actions can be taken. These actions may involve changing the collaborative beamforming vectors, or changing the active links that are co-scheduled. In most cases, this process will take place transparently without causing outages or failures of the active links, even in a heavily loaded network.

Finally, it is noted that, in the above description, the term "device" is taken as synonymous with both "piece of equipment" and "wireless network transceiver". However, in an additional embodiment of the invention, a single piece of equipment includes multiple wireless network transceivers. In this case, an embodiment of the current invention can be used to allow two co-scheduled links between one pair of equipments, therefore potentially significantly increasing the data rate at which the two pieces of equipment can communicate. This can be considered a special case of single-user MIMO spatial multiplexing, where no additional support beyond the current invention is required. Alternatively, one piece of equipment with multiple transceivers may communicate simultaneously with multiple pieces of equipment, or multiple pieces of equipment may communicate simultaneously with one piece of equipment with multiple transceivers. These can be considered special cases of multi-user MIMO spatial multiplexing, and again no additional support beyond the current invention is required. In order to ensure that the multiple links will be considered in the same subset, the subset selection method should be modified in this case to automatically include active links that correspond to the same piece of equipment in the same subset.

In an illustrative embodiment of the method according to the invention, pairs of devices may be spatially separated, said spatial separation may be quantified by a spatial separation indicator, said method may further comprise a preliminary act of defining subsets of pairs of devices in the plurality of pairs of devices using the spatial separation indicator and the acts of the method may be performed in at least one of the defined subset of pairs of devices.

In an illustrative embodiment of the method according to the invention, pairs of devices may be grouped in one or more subsets of pairs of devices from the plurality of pairs of devices. In this case, the method according an embodiment of to the invention may further comprise, prior to the act 510 of scheduling for emitting training signals, a preliminary act 500 a defining or predefining at least one subset in the plurality of pairs of devices. The criterion used for grouping pairs of devices in subset(s) may be any criterion that allows facilitating further scheduling of devices such as e.g. spatial separation of pairs of devices, code separation of pairs of devices, capabilities of pairs of devices or else etc. . . .

In an illustrative embodiment of the method according to the invention, only training signals emitted and received from the same predefined subset may be taken into account for scheduling.

In an illustrative embodiment of the method according to the invention, pairs of devices may be spatially separated and this spatial separation may be quantified by a spatial separation indicator using the subset definition unit 400 in reference to FIG. 4. For example, the values that indicate the spatial separation of the receivers for active links i and j may be given by:

$$D_{i,j} = 1 - \frac{|d_{(PNC)i}^H d_{(PNC)j}|}{\|d_{(PNC)i}\| \|d_{(PNC)j}\|} \quad [15]$$

$$S_{(PNC)i,j} = \left|\log_{10}\left(\frac{s_{(PNC)i}}{s_{(PNC)j}}\right)\right| \quad [16]$$

where $s_{(PNC)i}$ is proportional to the channel strength (e.g. Signal to Noise Ratio (SNR), adjusted according to the antenna gain) of the direct link between the receiver of the ith pair (or active link) and the PNC 100, and $d_{(PNC)i}$ is the receiver beamforming vector used by the PNC 100 for that direct link. The elements of $d_{(PNC)i}$ may equal the complex weights applied to each element of the PNC 100 receiver phased array antenna according to the settings of the phase shifters (and attenuators). Large values of $S_{(PNC)i,j}$ indicate the receivers 120 for the two pairs (or active links) are widely spaced in terms of distance from the PNC, while large values of $D_{i,j}$ (possible values between 0 and 1) indicate that the receivers 120 are widely spaced in angle with reference to the PNC 100, and therefore both active links may be added to the same subset. In the case that the PNC receiver antenna is a switched sector antenna (rather than a phased array), the angular separation of the sector beam directions used by the PNC receiver may be used as a proxy for $D_{i,j}$. In the case where the receiving DEV 120 of active link i is the PNC 100 itself (e.g. as is the case for link DEV1→DEV7 in reference to FIG. 1B), then the above technique is not applicable. Instead, the value $1/s_{(PNC)j}$ may be used as a proxy for $S_{(PNC)i,j}$, since if $s_{(PNC)j}$ is small it indicates the receiver of link/pair j and the PNC 100 (receive of link/pair i) are widely spaced. The PNC 100 may maintain a store in memory containing the most recent values of $s_{(PNC)j}$ and $d_{(PCP)i}$ each time a device and the PNC 100 directly communicate (at least this will have happened during the device association process, i.e. when the device made a request to the PNC 100 for joining the telecommunication network 10). Pairs in active links where these values were updated most recently may be preferred for inclusion in a subset, since it is least likely that the receiver would have physically moved significantly in the mean time (in which case the channel information would be out of date). The definition of subsets of devices allows to reduce the overhead of scheduling devices, when suitable for co-scheduling, without causing any signaling overhead on the wireless network. For example, in 60 GHz band wireless networks, as devices are typically nomadic in many usage cases, the estimate of spatial separation will be reliable in most cases even if the corresponding receiver and PNC 100 directly communicate only infrequently. In any case, subset definition may be used for further co-scheduling, but not necessarily to decide which pairs of devices should be allocated resources. Therefore, even if the channel information stored at the PNC 100 for a given pair of devices is out-of-date, there is no effect on the performance of the network other than possibly a marginal increase in the overhead to obtain channel information for additional pairs in active links in order to find enough pairs in active links suitable for co-scheduling.

Figure 6:
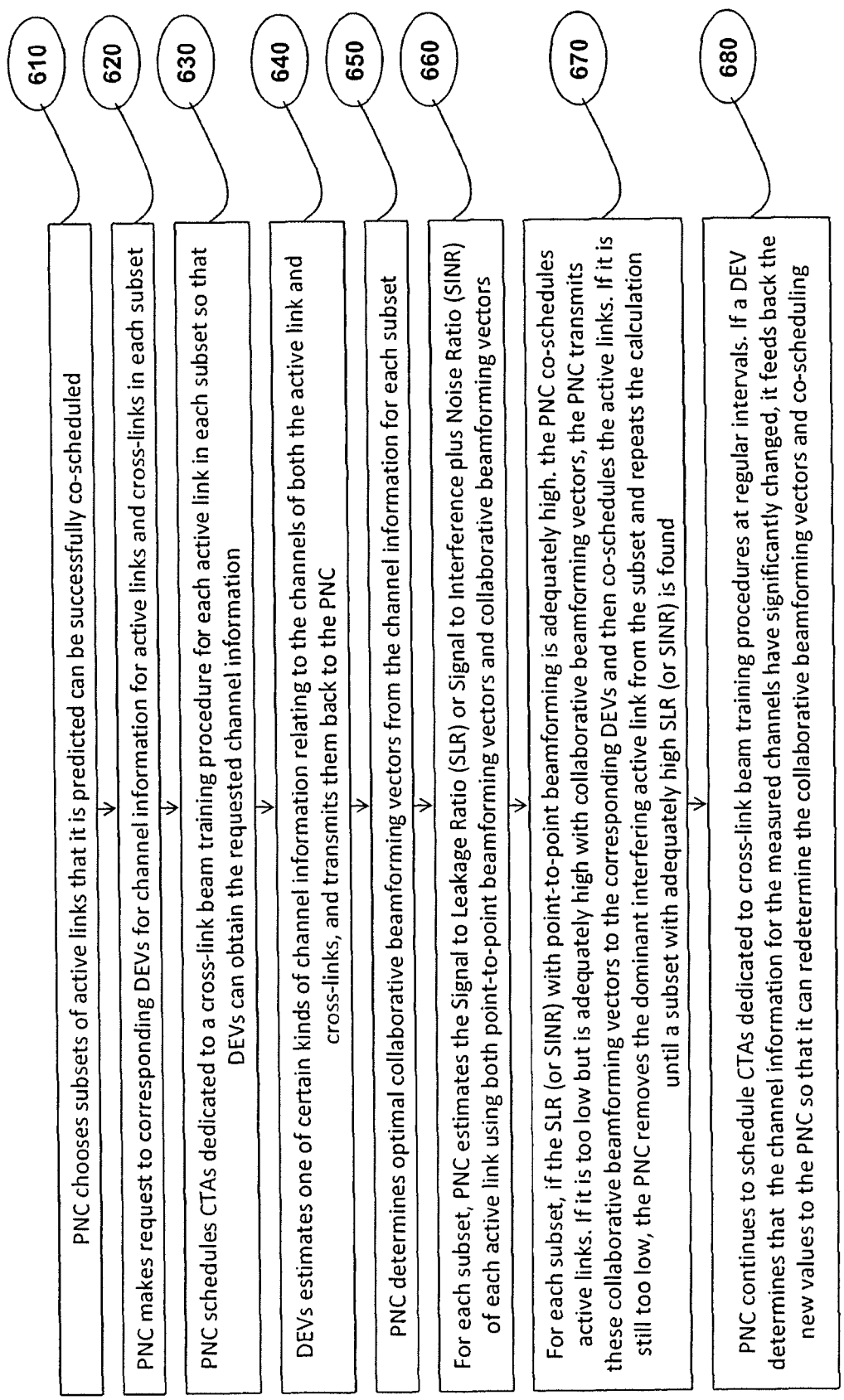
FIG. 6 schematically illustrates a method according to an embodiment of the present invention.

FIG. 6 describes an illustrative embodiment of the method according to the invention wherein subsets of pairs of devices are used. An act 610 allows a PNC 100 to choose subsets of pairs in active links that may be successfully co-scheduled according to a predefined criterion. Act 620 allows the PNC 100 to make a request to paired devices for channel information for pairs in active links and cross-links in each subset. Act 630 allows the PNC 100 to schedule CTAs dedicated to a cross link beam training procedure for each active link in each subset so that devices may obtain the requested channel information. Act 640 allows devices to estimate one of certain kinds of channel information relating to the channels of both active link and cross-link and may transmit them back to the PNC 100. Act 650 allows the PNC 100 to determine optimal collaborative vectors from the channel information for each subset. Act 660 allows, for each subset, the PNC 100 to estimate the Signal to Leakage Ratio (SLR) or Signal to Interference plus Noise Ratio (SINR) of each active link using both point-to-point beamforming vectors and collaborative beamforming vectors. Act 670 allows, for each subset, if the SLR (or SINR) with point-to-point beamforming is adequately high, the PNC 100 to co-schedule pairs in active links. If it is too low but adequately high with collaborative beamforming vectors, the PNC transmits these collaborative beamforming vectors to the corresponding devices and then co-schedule the pairs in active link. If it is still too low, the PNC 100 removes the dominant interfering pair in active link from the subset and repeats the calculation until a subset with adequately high SLR (or SINR) is found. Act 680 allows the PNC 100 to continue to schedule CTAs dedicated to cross-link beam training procedures at regular intervals. If a device determines that the channel information for the measured channels have significantly changed, it feeds back the new values to the PNC 100 so that it can, if necessary redetermine the collaborative beamforming vectors and co-scheduling.

A computer-readable medium having computer-executable instructions to enable a computer system to perform the method associated with the network coordinator.

A computer-readable medium having computer-executable instructions to enable a computer system to perform the method associated with the receiver.

In an illustrative embodiment of the method according to the invention, the method allows scheduling devices in a telecommunication network according to the invention, said devices are spatially separated and communicate in pairs, said spatial separation is quantified by an indicator, each of said pairs of devices comprises a transmitter and a receiver, and said method comprises, for a coordinating device in the telecommunication network, the acts of:
  predefining a (at least one) set of pairs of devices using the indicator of spatial separation between said devices,
  sending a request for channel information to devices in the at least one predefined set of pairs of devices, said channel information comprising information on the quality of signals received by the devices in the set from transmitting devices in the same set,
  receiving said channel information from (the receivers in the pairs of) devices in said predefined set,
  selecting, among the predefined set of pairs of devices and a subset of the predefined set of pairs of devices, the one with the greatest metric of signal quality using said received channel information,
  scheduling devices of the selected set or subset.

A method as here above wherein the channel information comprises information on the channel in each pair of device in the predefined set and information on channels received by the receiver of each pair of devices from transmitters of other pairs of devices.

In an illustrative embodiment of the method according to the invention, the method allows scheduling devices in the same time interval in a telecommunication network, said devices communicating in pairs, each of said pairs of devices comprising a transmitter and a receiver, said method comprising, for a coordinating device in the telecommunication network, the acts of:

scheduling each pair of devices, at different time intervals, for signal level measurements, obtaining channel information from a plurality of pairs of devices, said channel information being computed by each pair in the plurality of pairs of devices subsequently to signal level measurements, said channel information comprising a first beam indicator, said first beam indicator allowing deriving the optimum beam for a receiver to receive a signal from the transmitter in the same pair of devices, and a second beam indicator, said second beam indicator allowing deriving the optimum beam for a receiver to minimize the interference from signals received from transmitters in other pairs in the plurality of pairs of devices, calculating, for the plurality of devices, a first signal quality indicator using the first beam indicator, scheduling pairs of devices in the same time interval if said first signal quality indicator satisfies a first quality criterion, if the first signal quality indicator does not satisfy the first quality criterion:

calculating, for the plurality of devices, a second signal quality indicator using the first and second beam indicators, performing, until said second signal quality indicator satisfies said second quality criterion:

determining, among the pairs in the plurality of devices, the pair which causes the most interference, removing said pair from the set of the plurality of devices, recalculating the second signal quality indicator for said set, scheduling the remaining pairs of devices within the same time interval.

In an illustrative embodiment of the method according to the invention, the method allows scheduling devices in the same time interval in a telecommunication network, said devices communicating in pairs, each of said pairs of devices comprising a transmitter and a receiver, said method comprising, for a coordinating device in the telecommunication network, the acts of:

scheduling each pair of devices, at different time intervals, in order for each transmitter to transmit signals for signal measurements by receivers in a plurality of pairs of devices, obtaining channel information from the plurality of pairs of devices, said channel information being computed by each pair in the plurality of pairs of devices subsequently to signal level measurements and comprising channel estimation vectors of the channels of each of the plurality of pairs of devices, generating a channel estimation matrix for the plurality of pairs of devices using the channel estimation vectors, calculating, for a set of pairs of devices in the plurality of pairs of devices, a channel estimation criterion, scheduling, in the same time interval, pairs of devices in the set when the channel estimation criteria satisfies a quality criterion.

In an illustrative embodiment of the method according to the invention, the method allows scheduling devices in the same time interval in a telecommunication network, said devices communicating in pairs, each of said pairs of devices comprising a transmitter and a receiver, said method comprising, for a coordinating device in the telecommunication network, the acts of:

scheduling each pair of devices, at different time intervals, in order for each transmitter to transmit signals for signal measurements by receivers in a plurality of pairs of devices, obtaining channel information from the plurality of pairs of devices, said channel information being computed by each receiver in the plurality of pairs of devices subsequently to signal level measurements and comprising channel estimation vectors of the channels of each of the plurality of pairs of devices, generating a channel estimation matrix for the plurality of pairs of devices using the channel estimation vectors, said channel estimation matrix comprising channel estimates estimating the channel of each pair among the other pair in the plurality of pairs of devices, scheduling, in the same time interval, the pairs of devices in the plurality of pairs of devices whose corresponding channel estimates in the channel estimation matrix optimize a quality indicator.

The invention claimed is:

1. A method for scheduling pairs in a plurality of pairs of devices for pair communication in a telecommunication network, each of said pairs of devices comprising a transmitter and a receiver, said method comprising the following acts implemented by a coordinating device in the telecommunication network:

allocating a different time interval to each of the transmitters of said plurality of pairs for emitting training signals, said training signals allowing determining channel estimates, obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal, scheduling for pair communication, in the same time interval, the pairs of a set of pairs in the plurality of pairs for which a quality indicator verifies a predefined criterion, said quality indicator being determined using channel estimates obtained from receivers of the pairs in said set, and determining transmitter beamforming vectors using the channel estimates associated with the scheduled pairs and sending said transmitter beamforming vectors to each associated transmitter of the scheduled pairs, said transmitter beamforming vectors allowing the transmitter to transmit signals during the time interval with a spatial beam pattern associated with the channel estimates determined by said receiver.

2. A method according to claim 1, said method further comprising the acts of determining receiver beam forming vectors using the channel estimates associated with the scheduled pairs and sending said receiver beam forming vectors to each associated receiver of the scheduled pairs, said receiver beam forming vectors allowing the receiver to receive signals during the time interval with a spatial beam pattern associated with the channel estimates determined by said receiver.

3. A method according to claim 1, wherein pairs of devices are spatially separated and wherein said spatial separation is quantified by a spatial separation indicator, said method further comprising a preliminary act of defining subsets of pairs of devices in the plurality of pairs of devices using the spatial separation indicator and wherein the acts of the method are performed in at least one of the defined subset of pairs of devices.

4. A method for scheduling pairs in a plurality of pairs of devices for pair communication in a telecommunication network, each of said pairs of devices comprising a transmitter and a receiver, said method comprising, the following acts implemented by a receiver in the telecommunication network:
- receiving training signals emitted by at least one transmitter in said plurality of pairs,
- determining channel information by analysis of said at least one received training signal, said channel information comprising at least one channel estimate of a channel between the receiver and a transmitter having emitted said at least one received training signal, and
- sending the channel information to a network coordinator in the telecommunication network for further scheduling of the pair of devices comprising the receiver when said pair is in a set of pairs in the plurality of pairs for which a quality indicator verifies a predefined criterion, said quality indicator being determined using channel estimates obtained from receivers of the pairs in said set, wherein the channel estimates are one of a frequency-domain channel estimate, a transmitter-side spatial covariance matrix or eigenvectors and eigenvalues of a transmitter-side spatial covariance matrix.

5. A non-transitory computer-readable medium having computer-executable instructions stored thereon, which when executed by a computer system enable the computer system to perform a method for scheduling pairs in a plurality of pairs of devices for pair communication in a telecommunication network, each of said pairs of devices comprising a transmitter and a receiver, said method comprising the following acts implemented by the computer system in association with a coordinating device in the telecommunication network:
- allocating a different time interval to each of the transmitters of said plurality of pairs for emitting training signals, said training signals allowing determining channel estimates,
- obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal,
- scheduling for pair communication, in the same time interval, the pairs of a set of pairs in the plurality of pairs for which a quality indicator verifies a predefined criterion, said quality indicator being determined using channel estimates obtained from receivers of the pairs in said set, and
- determining transmitter beamforming vectors using the channel estimates associated with the scheduled pairs and sending said transmitter beamforming vectors to each associated transmitter of the scheduled pairs, said transmitter beamforming vectors allowing the transmitter to transmit signals during the time interval with a spatial beam pattern associated with the channel estimates determined by said receiver.

6. A non-transitory computer-readable medium having computer-executable instructions stored thereon, which when executed by a computer system enable the computer system to perform a method for scheduling pairs in a plurality of pairs of devices for pair communication in a telecommunication network, each of said pairs of devices comprising a transmitter and a receiver, said method comprising the following acts implemented by the computer system in association with a receiver in the telecommunication network:
- receiving training signals emitted by at least one transmitter in said plurality of pairs,
- determining channel information by analysis of said at least one received training signal, said channel information comprising at least one channel estimate of a channel between the receiver and a transmitter having emitted said at least one received training signal, and
- sending the channel information to a network coordinator in the telecommunication network for further scheduling of the pair of devices comprising the receiver when said pair is in a set of pairs in the plurality of pairs for which a quality indicator verifies a predefined criterion, said quality indicator being determined using channel estimates obtained from receivers of the pairs in said set, wherein the channel estimates are one of a frequency-domain channel estimate, a transmitter-side spatial covariance matrix or eigenvectors and eigenvalues of a transmitter-side spatial covariance matrix.

7. A method according to claim 1, wherein the channel estimates are one of a frequency-domain channel estimate, a narrowband Multiple Input Multiple Output channel matrix, a transmitter-side spatial covariance matrix or eigenvectors and eigenvalues of a transmitter-side spatial covariance matrix.

8. A method for scheduling pairs in a plurality of pairs of devices for pair communication in a telecommunication network, each of said pairs of devices comprising a transmitter and a receiver, said method comprising the following acts implemented by a coordinating device in the telecommunication network:
- allocating a different time interval to each of the transmitters of said plurality of pairs for emitting training signals, said training signals allowing determining channel estimates,
- obtaining channel information from at least one receiver, comprised in a pair of the plurality of pairs, having received training signals emitted by at least one of said transmitters, said channel information being determined by said receiver by analysis of said at least one received training signal, said channel information comprising at least one channel estimate of a channel between said receiver and a transmitter having emitted said at least one received training signal,
- scheduling for pair communication, in the same time interval, the pairs of a set of pairs in the plurality of pairs for which a quality indicator verifies a predefined criterion, said quality indicator being determined using channel estimates obtained from receivers of the pairs in said set, and
- determining receiver beamforming vectors using the channel estimates associated with the scheduled pairs and sending said receiver beamforming vectors to each associated receiver of the scheduled pairs, said receiver beamforming vectors allowing the receiver to receive signals during the time interval with a spatial beam pattern associated with the channel estimates determined by said receiver.

* * * * *